Feb. 7, 1967   E. R. CONLON   3,302,762
SPRING CLUTCH HAVING AXIAL ACTUATOR MEANS
Filed Sept. 4, 1964   4 Sheets-Sheet 1
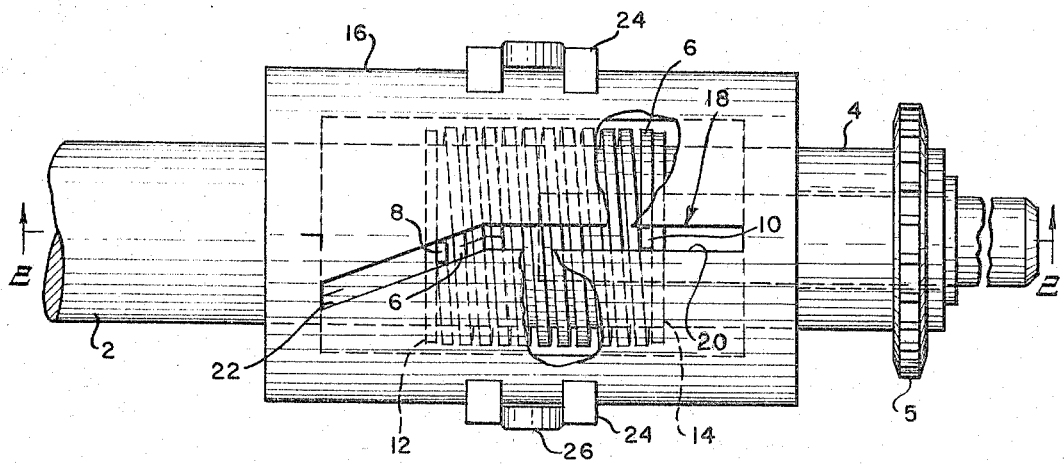
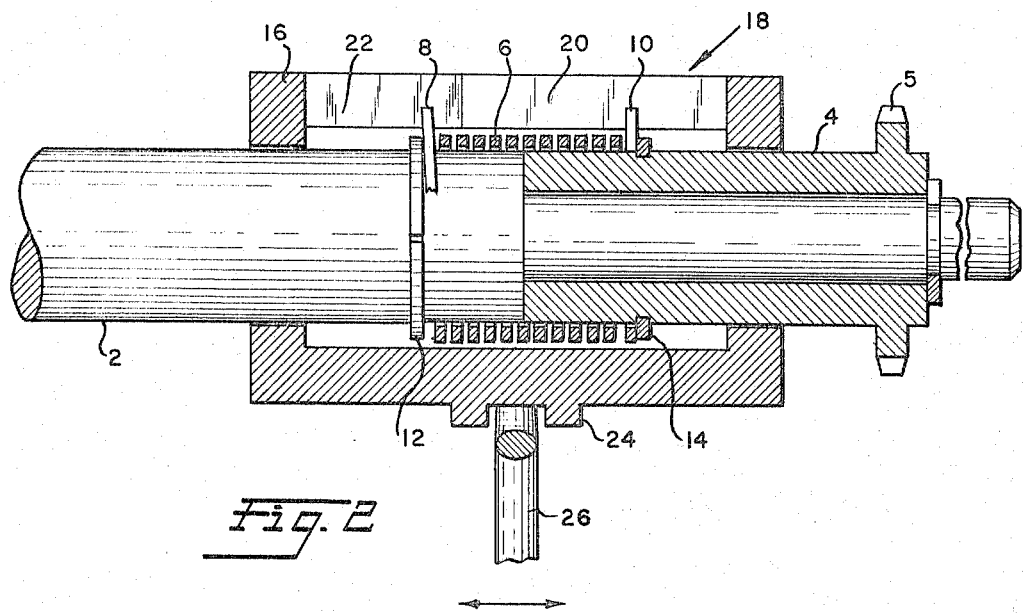
INVENTOR
EDWARD R. CONLON
BY
Scrivener Parker Scrivener & Clarke
ATTORNEYS Feb. 7, 1967   E. R. CONLON   3,302,762
SPRING CLUTCH HAVING AXIAL ACTUATOR MEANS
Filed Sept. 4, 1964   4 Sheets-Sheet 2

INVENTOR

EDWARD R. CONLON

BY
*Scrivener Parker Scrivener & Clarke*
ATTORNEYS

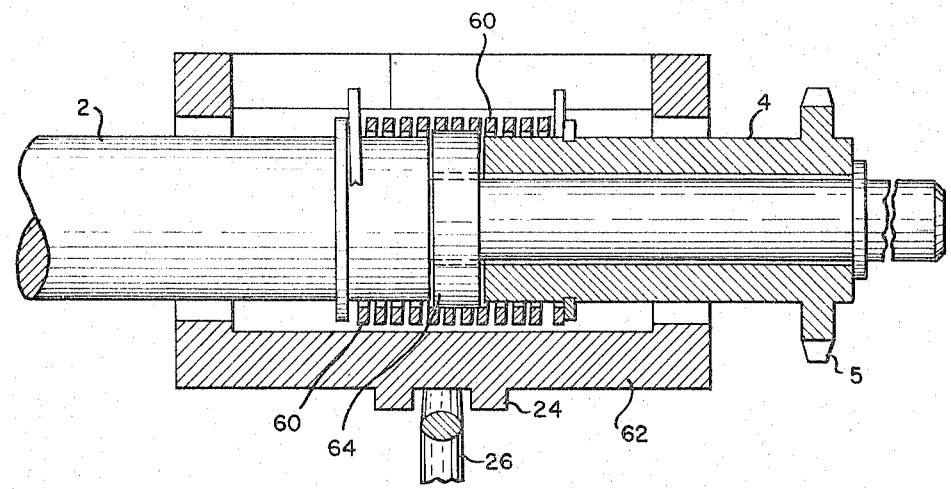
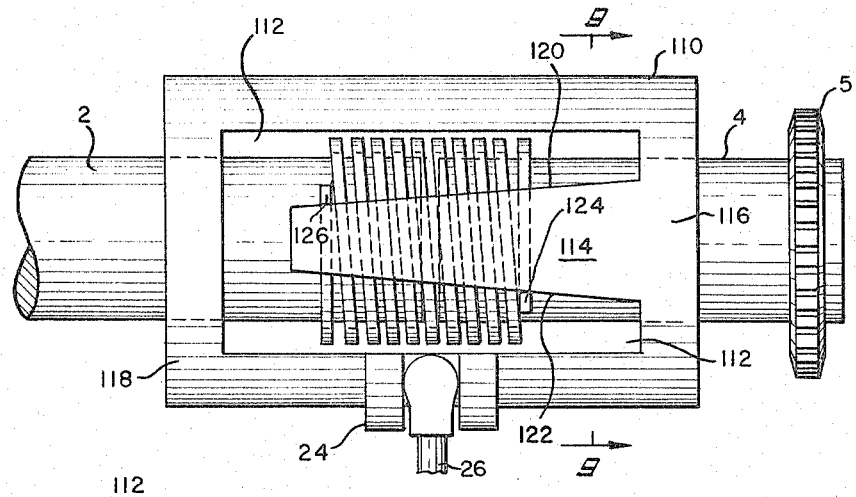
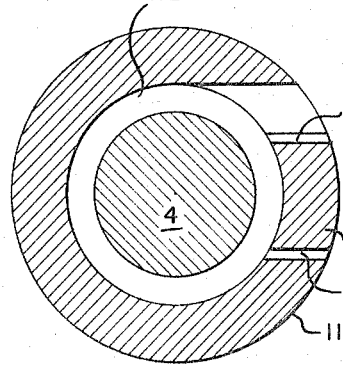

INVENTOR
EDWARD R. CONLON

United States Patent Office 3,302,762
Patented Feb. 7, 1967

3,302,762
SPRING CLUTCH HAVING AXIAL
ACTUATOR MEANS
Edward R. Conlon, Bristol, Conn., assignor to Associated Spring Corporation, Bristol, Conn., a corporation of Delaware
Filed Sept. 4, 1964, Ser. No. 394,403
17 Claims. (Cl. 192—81)

This invention relates broadly to power transmitting clutches and, more particularly, to those of the type in which a helical spring is associated in co-axial overlapping relation with the aligned ends of a drive shaft and an output shaft and may be operated to drivingly connect or disconnect the shafts by being moved radially into and out of wrapping and frictional engagement with them.

The principal object of this invention has been to provide a spring clutch of the described type but having a novel construction and mode of operation, by reason of which the clutch has fewer parts than known clutch devices of the same type but has improved efficiency and other operating characteristics, and in which very simple actuating means are provided for changing the diameter of the spring to operate it into and out of driving relation to the shafts.

The invention is described in the following specification and is illustrated in the accompanying drawings, in which:

FIG. 1 is an elevational view showing drive and driven shafts and a spring clutch according to the invention;

FIG. 2 is a longitudinal sectional view of the clutch shown in FIG. 1, taken on line 2—2 of FIG. 1;

FIG. 5 is a sectional view similar to FIG. 2 and showing a further embodiment of the invention;

FIG. 8 is an elevational view showing a modified form of clutch spring actuator, and FIG. 9 is a sectional view taken on line 9—9 of FIG. 8.

Figure 3:
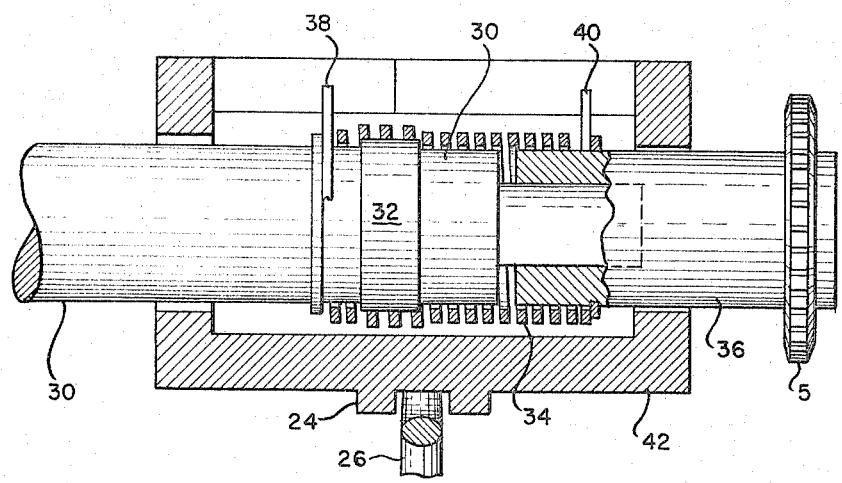
FIG. 3 is a sectional view similar to FIG. 2 but showing a second embodiment of the invention.

A preferred embodiment of the invention is disclosed in FIGS. 1 and 2 of the drawings in assembled and operative relation to a driving shaft 2 and a driven shaft 4 which are in aligned relation with the driven shaft rotatably journaled on the end of the drive shaft and carrying a gear 5. A helical clutch spring 6 surrounds the aligned end parts of the two shafts and is normally disengaged from both shafts, by which it is meant that it loosely surrounds both shafts, as is most clearly shown in FIG. 2. Each of the two ends of the wire forming the helical clutch spring is turned outwardly, forming two tangs 8, 10. Each of the shafts is provided with a flange or abutment, which are shown at 12, 14, and each of these is so positioned with respect to the end of its associated shaft that it engages an end of the clutch spring when the spring is in its normal unstressed condition removed from both shafts.

Means are provided by the invention for operating the spring 6 into engagement with the drive and driven shafts in order to transmit the rotation of the drive shaft to the output shaft and to the parts connected thereto by the gear 5. Such means comprise an operating member in the form of a cylindrical sleeve 16 surrounding the clutch spring, and which is provided with an axially extending cam slot 18 having a straight part 20 which extends axially of the sleeve and of the aligned shafts, and a second part 22 which extends at an angle to the axially extending part 20. Tang 10 is received within the axially extending part 20 of the cam slot and the other tang 8 is received within the angularly related part 22 of the slot. The width of each part of the slot is such that the sides of the slot engage the tangs without lost motion and without friction. The operating sleeve is mounted for axial movement with respect to the driving and driven shafts and also with respect to the clutch spring. When it is so moved no circumferential movement is imparted to the one tang 10 which is positioned within the straight, axially extending part 20 of the cam slot, but circumferential movement is imparted to the second tang 8 which is positioned within the angularly related part 22 of the cam slot. The angular relation of the two parts of the cam slot is such in the presently described embodiment of the invention that upon axial movement of the actuator sleeve 16 in one direction the relative movement of the two tangs causes the spring to tighten throughout its length on the parts of the driving and driven shafts which it surrounds, thus causing it to transmit the rotation of the driving shaft to the driven shaft. The engagement of the ends of the clutch spring by the flanges 12, 14 on the shafts prevents axial movement of the spring coils on relative circumferential movement of the tangs, thereby insuring that such relative movement of the tangs will cause radial movement of the convolutions of the clutch spring.

Any suitable means may be provided for imparting axial movement to the sleeve 16 for operating the clutch, and in FIGS. 1 and 2 such means take the form of a collar 24 and yoke 26.

If desired, the clutch spring may normally surround and engage only one of the driving and driven shafts instead of being normally disengaged from both as in the embodiment of the invention disclosed in FIGS. 1 and 2, and a form of the invention, so modified, is illustrated in FIG. 3. In the form so illustrated the drive shaft 30 is provided with a radially enlarged part 32 which is normally and constantly tightly engaged by the clutch spring 34, which also surrounds and is normally spaced radially outwardly from the end part of the output shaft 36. The spring is provided at its ends with tangs 38, 40 which are positioned within the angularly related parts of the slot in the actuator 42 as described hereinbefore, and when the actuator is moved axially with respect to the shafts and the clutch spring one of the tangs is moved circumferentially with respect to the other, and the spring is tightened on the driven shaft, providing a driving connection between the two shafts. This form of the invention has the advantage of making it possible to shorten the driving shaft and spring and, in addition, provides a useful method of locking the spring against axial creep caused by repeated clutch operation.

Figure 4:
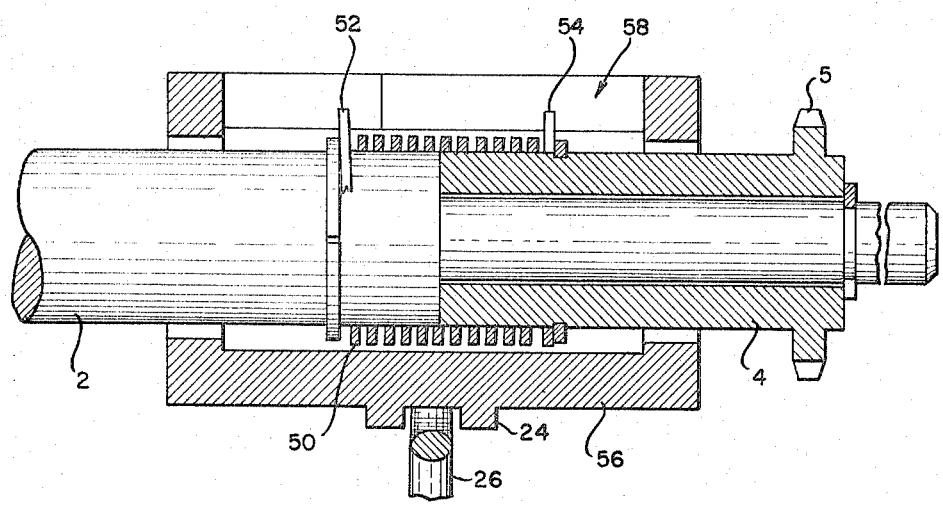
FIG. 4 is a sectional view similar to FIG. 2 but showing a third embodiment of the invention.

In a third basic form which the invention may take the clutch spring normally engages both the drive and driven shafts to normally provide a driving connection between them, and is released from the shafts by relative circumferential movement of the ends of the spring caused by axial movement of the actuating member. This form of the invention is disclosed in FIG. 4 of the drawings and comprises drive and driven shafts 2, 4, clutch spring 50 having end tangs 52, 54, and actuator 56 having slot 58 in which the tangs are positioned. The clutch spring is normally in tight engagement with the end parts of both shafts, thus normally providing a driving connection between them, and is moved radially outwardly out of engagement with both shafts upon axial movement of the actuator which imparts relative circumferential movement to the ends of the spring. It will be observed that in this form of the invention the angular relation of the two parts of the slot in the actuator is reversed with respect to that of the form of the invention disclosed in FIGS. 1 to 3, as the direction of radial movement of the spring is reversed.

A further modification of the invention is disclosed in FIG. 5 in connection with the usual described components consisting of the drive and driven shafts 2, 4, clutch spring 60 and actuator 62. In this form of the invention the aligned adjacent ends of the drive and driven shafts are spaced apart and the drive shaft extension on which the driven shaft is rotatably journaled is surrounded by an annular washer 64 the outside diameter of which is greater than that of either the drive or the driven shaft. This washer increases the diameter of the shaft assembly at the point where the spring crosses over from one shaft to the other and this results in removal of the spring from the adjacent ends of the shaft and a reduction in the high inward radial pressure of the spring on the ends of the shaft, thus reducing wear of the shaft ends and the spring at the crossover point.

Figure 6:
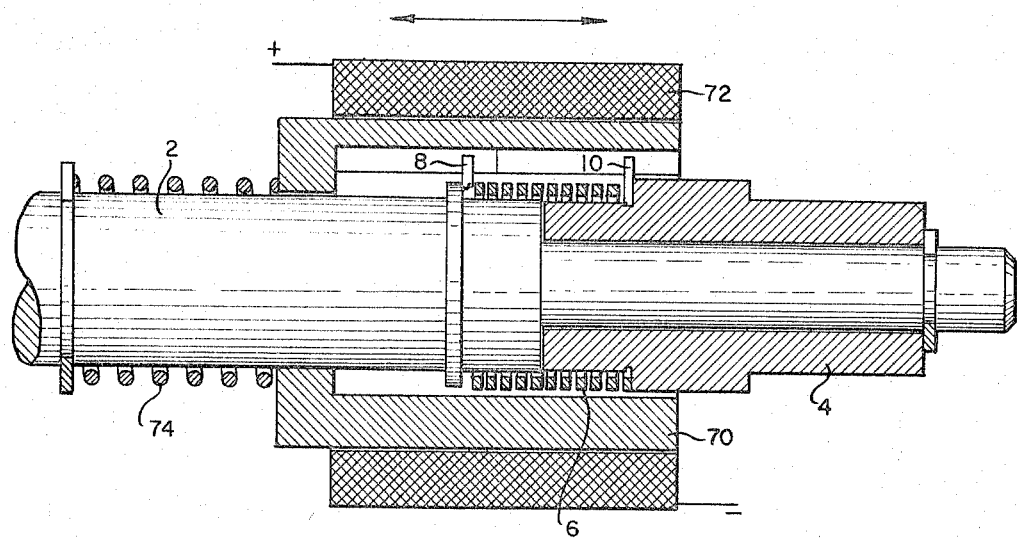
FIG. 6 is a sectional view showing a solenoid-type actuator for the spring clutch provided by the invention.

In FIG. 6 of the drawings there is disclosed a novel means provided by the invention for effecting axial operating movement of the clutch actuator. In this form of the invention the actuating sleeve 70 in which the cam slot is formed is the armature of a solenoid which also includes the windings 72 and a spring 74 which normally maintains the actuator sleeve in a position in which the spring tangs 8, 10 are in their normal positions and the clutch spring loosely surrounds the driving and driven shafts. Upon energization of the solenoid winding the actuating sleeve is moved axially to the clutch spring and to the aligned shafts, thus imparting relative circumferential movement to the ends of the clutch spring to either tighten the spring on one or both shafts or remove it therefrom, in either case in accordance with one of the embodiments of the invention which have been described. It will be apparent that in any of the various forms which the invention may take the operation of the actuator may be effected by solenoid means.

Figure 7:
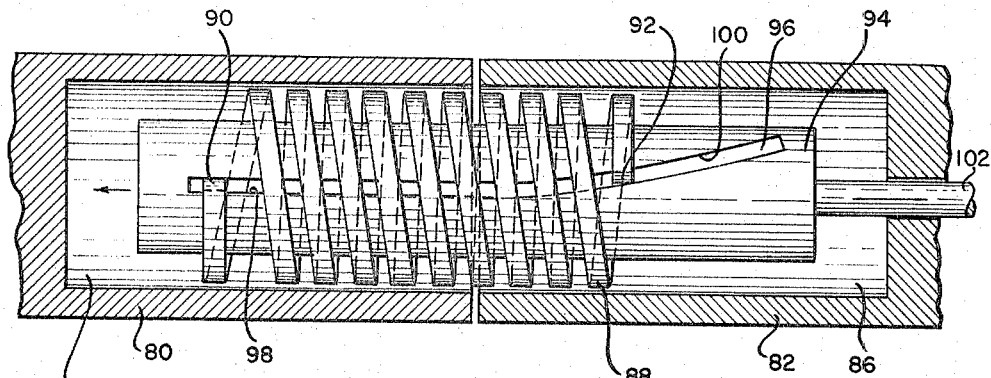
FIG. 7 is a part sectional and part elevational view showing a further form which the invention may take.

In the forms of the invention heretofore described in this specification the clutch spring surrounds the ends of the drive and driven shafts. This, however, is not a necessary relation of the parts in accordance with the invention and, if desired, the clutch spring may be positioned within the aligned ends of the drive and driven shafts with any relation between the spring and shafts such as described in connection with any of the various forms and embodiments of the invention. Such a construction is disclosed in FIG. 7, in which the aligned, spaced driving and driven shafts 80, 82, or at least the end parts thereof, are axially bored as shown at 84, 86. A helical clutch spring 88 is positioned within the two shaft bores and extends between the shafts and, in the illustrated embodiment, has an outside diameter less than the inside diameter of the bore in each of the two shafts. The ends of the wire forming the clutch spring are turned radially inwardly forming two tangs 90, 92 and a cylindrical actuating member 94 is positioned within the spring and extends from end to end thereof and has a cam slot 96 in its outer surface, one part 98 of which is straight and extends axially of the actuating member, and a second part 100 of which extends at an angle to the first part. The tangs are received, respectively, in the two parts of the cam slot. Suitable means, which are indicated at 102, are provided for imparting axial movement to the actuator and it will be apparent that such movement will cause relative circumferential movement of the tangs. While the clutch spring in FIG. 7 is shown to be normally removed from the inner surfaces of the drive and driven shaft parts, it will be understood that this is only illustrative of this embodiment of the invention. In addition to this relation of the spring to the shafts, in this "internal" form of the invention the clutch spring may normally engage one shaft only as in FIG. 3, or may normally engage both shafts as in FIG. 4, or the washer of FIG. 5 may be provided, or other forms and embodiments of the invention may be utilized.

In FIGS. 8 and 9 of the drawings there is disclosed a modified form of clutch actuator which may be used with any embodiment of the invention to produce very rapid clutch actuation by exerting cam action on both tangs instead of only one, as in the previously described embodiments of the invention. This actuator 110 is provided with an axially and circumferentially extending aperture 112 within which there is centrally positioned an elongated member 114 which is formed integrally with the actuator and extends axially of the actuator from one end part 116 thereof toward the other end part 118 forming a tongue-like member lying centrally of the opening 112. This member is tapered from one end to the other so that its side edges 120, 122 provide cam surfaces which, respectively, engage the two tangs 124, 126 on the ends of the clutch spring. It will be apparent that by reason of their engagement by two cam surfaces, instead of one, the two tangs will be more rapidly moved with respect to each other on any axial movement of the actuator, with consequent more rapid clutch operation.

Instead of providing the tang actuator of the invention with a tongue 114 as in FIGS. 8 and 9, the actuator may have a cut out portion or aperture having the same shape as the tongue 114 and therefore having converging side edges which engage the tangs, thus providing the same effect as the tongue 114.

While I have described and illustrated in this specification certain forms which my invention may take, it will be apparent to those skilled in the arts to which it relates that other embodiments, as well as modifications of those disclosed, may be made and practiced without departing from the spirit or scope of the invention, for the limits of which reference must be made to the appended claims.

What is claimed is:

1. A clutch for connecting and disconnecting two aligned relatively rotatable shafts, comprising a helical coil spring mounted co-axially with the shafts and having its end parts overlapping the end parts of the shafts, actuator means movable axially of the spring and having parts engaging the ends of the spring and operable on such axial movement to move the ends circumferentially of the spring and with respect to each other to change the radial dimension of the spring to move it into and out of driving relation to the shafts, and means for imparting such axial movement to the actuator.

2. A clutch for connecting and disconnecting two aligned relatively rotatable shafts, comprising a helical coil spring mounted co-axially with the shafts and having its end parts overlapping the end parts of the shafts, the ends of the spring being engageable whereby they may be operated to be moved circumferentially of the spring and shafts with respect to each other to move the spring radially into and out of circumferential contact with the shafts, an actuator mounted for sliding movement axially of the shaft and spring assembly and with respect thereto, and means operable upon axial movement of the actuator for producing relative circumferential movement of the ends of the spring.

3. A clutch for connecting and disconnecting two aligned relatively rotatable shafts, comprising a helical coil spring having its end parts surrounding the end parts of the shafts and normally frictionally and drivingly engaging both of them, the ends of the spring being engageable whereby they may be operated to be moved circumferentially of the spring and shafts and with respect to each other, an actuator mounted for movement axially of the shaft and spring assembly and with respect thereto, and means on the actuator engaging the ends of the spring and operable on axial movement of the actuator to move the ends of the spring circumferentially with respect to each other to cause the spring to be moved radially of the shafts.

4. A clutch for connecting and disconnecting two aligned relatively rotatable shafts, comprising a helical coil spring having its end parts surrounding the end parts of the shafts and normally tightly surrounding and grasping one shaft and loosely surrounding the other, the ends of the spring being engageable whereby they may be operated to cause the ends of the spring to be moved circumferentially of the spring and shafts and with respect to each other, an actuator mounted for movement axially of the shaft and spring assembly and with respect thereto, and means on the actuator engaging the ends of the spring and operable on axial movement of the actuator to move the ends of the spring circumferentially with respect to each other to cause the end part of the spring surrounding said other shaft to be moved radially of said other shaft.

5. A clutch according to claim 4, in which one of said shafts has a radially enlarged part which is normally tightly surrounded and grasped by the spring.

6. A clutch for transmitting rotational movement between spaced axially aligned driving and driven shafts, comprising a helical spring adapted to extend between the shafts with its end parts overlapping the end parts of the shafts, the ends of the spring being turned to form tangs at the opposite ends of the spring, the diameter of the spring being such that the spring is normally out of engagement with both shafts and is inoperative to transmit rotational movement between them, and means movable axially of the spring and engaging both of the tangs for producing relative circumferential movement of the tangs thereby to change the diameter of the spring to move it into engagement with the shafts to transmit rotational movement between them.

7. A clutch for transmitting rotational movement between spaced axially aligned driving and driven shafts, comprising a helical spring adapted to extend between the shafts with its end parts overlapping the end parts of the shafts, the ends of the spring being turned to form a tang at each end of the spring, the diameter of the spring being such that the spring is normally out of engagement with both shafts and is inoperative to transmit rotational movement between them, and a sleeve surrounding the spring and movable axially thereof and having parts engaging the tangs which are operable on axial movement of the sleeve to produce relative circumferential movement of the tangs thereby to change the diameter of the spring to move it into engagement with the shafts to drivingly connect the shafts.

8. A clutch for connecting and disconnecting spaced axially aligned driving and driven shafts, comprising a helical coil spring extending between the shafts with its end parts overlapping the end parts of the shafts, the ends of the spring being turned to form tangs which may be engaged and operated circumferentially with respect to each other to cause the spring to move bodily radially of the shafts, and a sleeve surrounding the spring and movable axially thereof and having a slot therein having two angularly related parts in which, respectively, the tangs are positioned, whereby upon axial movement of the sleeve relative circumferential movement of the tangs is produced thereby to change the diameter of the spring.

9. A clutch device for connecting and disconnecting two aligned relatively rotatable shafts, comprising a helical coil spring mounted co-axially with the shafts and having its end parts overlapping the end parts of the shafts, actuator means movable axially of the spring and having parts engaging the ends of the spring and operable on such axial movement to move the ends circumferentially of the spring and with respect to each other to change the radial dimension of the spring to move it into and out of driving relation to the shafts, an electrical coil associated with said actuator and forming a solenoid therewith whereby energization of said coil produces axial movement of the actuator.

10. A clutch device according to claim 8, in which the spring is normally out of engagement with both shafts.

11. A clutch device according to claim 8, in which the spring is normally in engagement with both shafts.

12. A clutch device according to claim 8, in which the spring is normally in clutching engagement with one shaft and loosely engages the other.

13. A clutch for transmitting rotational movement between spaced axially aligned driving and driven shafts, comprising a helical spring extending between the shafts with its end parts surrounding the end parts of the shafts, the inside diameter of the spring, when in repose, being greater than the outer diameter of each shaft, each end of the spring being turned outwardly to form a tang, an actuating member surrounding the spring and movable axially thereof, and means on said actuating member engaging said tangs and operable on axial movement of the actuating member to produce relative circumferential movement of the spring tangs to thereby decrease the diameter of the spring to cause it to engage the outer surfaces of the shafts and transmit rotational movement between them.

14. A clutch for transmitting rotational movement between spaced axially aligned driving and driven shafts, comprising a helical spring extending between the shafts with its end parts surrounding the end parts of the shafts, the inside diameter of the spring, when in repose, being greater than the outer diameter of each shaft, each end of the spring being turned outwardly to form a tang, an actuating member surrounding the spring and movable axially thereof, a slot in said actuating member having a first part extending axially of the spring and a second part extending at an angle to the first part, said tangs being positioned, respectively, in the first and second parts of the slot whereby on axial movement of the actuating member relative circumferential movement of the spring tangs is produced thereby to decrease the diameter of the spring to cause it to engage the outer surfaces of the shafts and transmit rotational movement between the shafts.

15. A clutch device according to claim 1, in which the actuator comprises two oppositely directed cam surfaces each engaging one of the ends of the spring.

16. A clutch associated with aligned relatively rotatable shafts for selectively providing a driving connection between them, comprising a helical coil spring having its end parts surrounding the end parts of the shafts, an actuator mounted for movement axially of the shaft and spring assembly and having parts engaging the ends of the spring which are constructed and operable on axial movement of the actuator in opposite directions to move the ends of the spring circumferentially in opposite directions, respectively, with respect to each other to move the end parts of the spring radially of the shafts and into and out of engagement therewith.

17. A clutch for connecting and disconnecting two aligned relatively rotatable shafts, comprising a helical coil spring mounted co-axially with the shafts and having its end parts overlapping the end parts of the shaft, a cylindrical actuator movable axially of the spring and having a cut-out part and two elongated cam surfaces within said cut-out part engaging the ends of the spring and operable on such axial movement to move the ends circumferentially of the spring and with respect to each other to change the radial dimension of the spring to move it into and out of driving relation to the shaft, and means for imparting such axial movement to the actuator.

References Cited by the Examiner
UNITED STATES PATENTS

| | | | |
|---|---|---|---|
| 1,973,671 | 9/1934 | Stevenson | 192—81 X |
| 2,098,021 | 11/1937 | Wheeler. | |
| 2,214,487 | 10/1940 | Starkey | 192—81 X |
| 2,242,379 | 5/1941 | Wahl. | |
| 2,595,213 | 4/1952 | Raynor. | |
| 2,698,678 | 1/1955 | Dale et al. | 192—41 |
| 2,890,477 | 6/1959 | Miller | 192—81 X |
| 2,895,578 | 7/1959 | Winchell | 192—41 |
| 2,976,976 | 3/1961 | Parker | 192—81 X |
| 3,006,448 | 10/1961 | Fox | 192—81 |

DAVID J. WILLIAMOWSKY, *Primary Examiner.*

A. T. McKEON, *Assistant Examiner.*